(12) United States Patent
Card et al.

(10) Patent No.: US 6,601,021 B2
(45) Date of Patent: Jul. 29, 2003

(54) SYSTEM AND METHOD FOR ANALYZING EYETRACKER DATA

(75) Inventors: Stuart K. Card, Los Altos Hills, CA (US); Peter L. T. Pirolli, San Francisco, CA (US); Robert W. Reeder, Los Altos Hills, CA (US)

(73) Assignee: Xerox Corporation, Stamford, CT (US)

( * ) Notice: Subject to any disclaimer, the term of this patent is extended or adjusted under 35 U.S.C. 154(b) by 184 days.

(21) Appl. No.: 09/731,783

(22) Filed: Dec. 8, 2000

(65) Prior Publication Data

US 2002/0103625 A1 Aug. 1, 2002

(51) Int. Cl.[7] .............................................. G06F 15/00
(52) U.S. Cl. ..................... 702/187; 702/187; 702/19; 702/108; 702/182; 351/203; 351/208; 600/400; 600/404; 600/408; 340/3.6; 707/6; 707/101
(58) Field of Search .................... 702/19, 108, 182, 702/183, 186–188, FOR 103, 104, 131, 135, 170, 171; 351/203, 204, 208–211, 246; 707/1, 3–7, 101, 102, 104, 104.1, 500, 502, 513, 516, 517, 520, 521, 523, 526; 600/400, 404, 405, 408, 558, 921

(56) References Cited

U.S. PATENT DOCUMENTS 4,789,235 A    12/1988   Borah et al.
4,931,865 A    6/1990    Scarampi
5,204,703 A    4/1993    Hutchinson et al. ........ 351/210
5,231,674 A    7/1993    Cleveland et al.
5,410,376 A    4/1995    Cornsweet et al.
5,471,542 A    11/1995   Ragland
5,886,683 A  * 3/1999    Tognazzini et al. ......... 345/146
6,091,378 A    7/2000    Richardson et al.
6,102,870 A    8/2000    Edwards
6,106,119 A    8/2000    Edwards

OTHER PUBLICATIONS

Salvucci et al., "Identifying Fixations and Saccades in Eye-Tracking Protocols", Proceedings Eye Tracking Research & Applications Symposium, Palm Beach Gardens, Nov. 6–8, 2000, pp. 71–78 (2000).

* cited by examiner

Primary Examiner—Marc S. Hoff
Assistant Examiner—Elias Desta
(74) Attorney, Agent, or Firm—Nixon Peabody LLP.

(57) ABSTRACT

Methods and Systems for analyzing data of a user viewing a display of dynamic hypermedia pages through a browser including monitoring and storing location and time of the user's gaze as eyetracker data, processing the eyetracker data into fixation data, monitoring and storing content of the displayed pages into a memory, restoring the displayed pages from the memory, mapping the fixations data onto the restored pages to thereby identify elements-of-regard, and storing the identified elements-of-regard in an elements-of-regard database.

23 Claims, 5 Drawing Sheets

TABLE 1: EVENT LOG SCHEMA

| EVENT NAME (EVENT-SPECIFIC PARAMETERS) | WHEN FIRED |
|---|---|
| MOUSE-BUTTON (DOWN or UP, LEFT, MIDDLE, or RIGHT button, mouse x, mouse y) | Fired when a mouse button is clicked (DOWN) or released (UP) |
| CHAR (character, mouse x, mouse y) | Fired when a character is entered from the keyboard |
| DOC-CLICK (mouse screenX, mouse screenY, element tagName, element innerText) | Fired when mouse is clicked somewhere on the HTML document |
| DOC-DOUBLECLICK (mouse screenX, mouse screenY, element tagName, element innerText) | Fired when mouse is double-clicked somewhere on the HTML document |
| DOC-MOUSEMOVE (mouse screenX, mouse screenY) | Fired when mouse is moved over the HTML document |
| DOC-KEYPRESS (character, element tagName) | Fired when focus is on an HTML element and a character (incl. special chars like newline) is entered |
| TOOLBAR (Button name) | Recorded when user presses a button on browser's toolbar |
| FILE-MENU (Command name) | Recorded when user executes a command from browser's File menu |
| EDIT-MENU | Recorded when user executes a command from browser's Edit menu |
| ACCEL (Command name) | Recorded when user performs an action using a keyboard accelerator (e.g. Ctrl-O to Open a URL) |
| ACTIVE-SCROLL (horizontal scroll position, vertical scroll position, scroll width, scroll height) | Recorded when user uses browser's scrollbars to see more of the document in the main browser window |
| BEFORE-NAVIGATE (URL to load) | Recorded when browser first begins loading a new URL |
| NAVIGATE-COMPLETE (URL to load) | Recorded when browser has contacted server and begins rendering new page |
| DOCUMENT-COMPLETE (URL to load) | Recorded when browser finishes loading a new URL |

*FIG. 3*

Sample Data of Element Database

"Subject16","JAVA","http://www.altavista.xom/cgi-bin/query?sc=on&hl=on&q=%22java+2%22+%2B+APIs+%2B+v1.2.2&ki=XX&pg=q","","\\louise\uir\onrx3\subjects\phase2\Subject 16\Subject16 00.03.15 16.45.44 JAVA\",236,"FONT","java.sun.com/products/jdk/1.2/install-windows.html",96,432,279,15

"Subject16","JAVA","http://www.altavista.xom/cgi-bin/query?sc=on&hl=on&q=%22java+2%22+%2B+APIs+%2B+v1.2.2&ki=XX&pg=q","","\\louise\uir\onrx3\subjects\phase2\Subject 16\Subject16 00.03.15 16.45.44 JAVA\",237,"IFRAME","",571,434,130,85

"Subject16","JAVA","http://www.altavista.xom/cgi-bin/query?sc=on&hl=on&q=%22java+2%22+%2B+APIs+%2B+v1.2.2&ki=XX&pg=q","","\\louise\uir\onrx3\subjects\phase2\Subject 16\Subject16 00.03.15 16.45.44 JAVA\",238,"FONT","Last modified on: 7-Jan-2000 - 34K bytes - in English",67,447,290,15

"Subject16","JAVA","http://www.altavista.xom/cgi-bin/query?sc=on&hl=on&q=%22java+2%22+%2B+APIs+%2B+v1.2.2&ki=XX&pg=q","","\\louise\uir\onrx3\subjects\phase2\Subject 16\Subject16 00.03.15 16.45.44 JAVA\",239,"BR","",67,447,0,15

"Subject16","JAVA","http://www.altavista.xom/cgi-bin/query?sc=on&hl=on&q=%22java+2%22+%2B+APIs+%2B+v1.2.2&ki=XX&pg=q","","\\louise\uir\onrx3\subjects\phase2\Subject 16\Subject16 00.03.15 16.45.44 JAVA\",240,"A","Related pages",294,462,95,16

Sample Data of Elements-of-Regard Database

"Subject16","JAVA","00.03.15 16.45.44","http://www.altavista.xom/cgi-bin/query?sc=on&hl=on&q=%22java+%22+%2B+APIs+%2B+v1.2.2&ki=XX&pg=q",""\\louise\uir\onrx3\subjects\phase2\Subject 16\Subject16 00.03.15 16.45.44 JAVA\",238479,183,1,"34K",235,450,529,578,235,450,254,375,0

"Subject16","JAVA","00.03.15 16.45.44","http://www.altavista.xom/cgi-bin/query?sc=on&hl=on&q=%22java+%22+%2B+APIs+%2B+v1.2.2&ki=XX&pg=q","\\louise\uir\onrx3\subjects\phase2\Subject 16\Subject16 00.03.15 16.45.44 JAVA\",238663,100,1,"bytes",254,448,548,576,254,448,263,374,0

"Subject16","JAVA","00.03.15 16.45.44","http://www.altavista.xom/cgi-bin/query?sc=on&hl=on&q=%22java+%22+%2B+APIs+%2B+v1.2.2&ki=XX&pg=q","\\louise\uir\onrx3\subjects\phase2\Subject 16\Subject16 00.03.15 16.45.44 JAVA\",238846,100,1,"...",289,428,583,556,289,428,279,363,0

"Subject16","JAVA","00.03.15 16.45.44","http://www.altavista.xom/cgi-bin/query?sc=on&hl=on&q=%22java+%22+%2B+APIs+%2B+v1.2.2&ki=XX&pg=q","\\louise\uir\onrx3\subjects\phase2\Subject 16\Subject16 00.03.15 16.45.44 JAVA\",238946,100,1,"...",291,424,585,552,291,424,280,361,0

"Subject16","JAVA","00.03.15 16.45.44","http://www.altavista.xom/cgi-bin/query?sc=on&hl=on&q=%22java+%22+%2B+APIs+%2B+v1.2.2&ki=XX&pg=q","\\louise\uir\onrx3\subjects\phase2\Subject 16\Subject16 00.03.15 16.45.44 JAVA\",239263,100,1,"[",353,448,647,576,353,448,309,374,0

SYSTEM AND METHOD FOR ANALYZING EYETRACKER DATA

This invention was developed with government funding under Office of Navel Research Grant No. N00014-96-C-0097. The U.S. Government may have certain rights.

FIELD OF THE INVENTION

The present invention relates generally to the field of eyetracking and, more particularly, to a system and method for analyzing eyetracker data collected from a user viewing the display of dynamic hypermedia pages.

BACKGROUND OF THE INVENTION

In various fields, psychologists and other researchers have used eyetracking devices (or eyetrackers) to record eye fixations, eye movements, and pupil dilation, as a way to infer the locus of a person's visual attention. This inference is generally referred to as the "mind-eye assumption". In this regard, disclosures related to eye fixations, movements and dilation are in U.S. Pat. No. 5,471,542 to Ragland, U.S. Pat. No. 5,410,376 to Cornsweet et al., and U.S. Pat. No. 5,231,674 to Cleveland et al. In one application, these types of systems have been utilized to monitor eye-movements to gather data from television viewers. U.S. Pat. No. 4,789,235 to Borah et al. discloses a method and system for generating a description of the distribution of looking time as people watch television commercials. This reference describes a system in which eyetracking is used to measure individual's interest in distinct visual areas of different television scenes.

A basic problem in eyetrackers concerns the mapping of the eyetracking data ("points-of-regard" of the eye) onto elements of the hypermedia pages to thereby identify the elements upon which the user was fixated/focused upon ("elements-of-regard"). The mapping of points-of-regard onto elements-of-regard is referred to herein as the "points-to-elements" mapping and this mapping poses a significant difficulty in applying eyetracking technology to hypermedia. Generally, eyetrackers monitor and record the user's eye gaze in a coordinate system that is an overlay of a section of physical space. For instance, an eyetracker might record a set of (x,y) coordinates that identifies a section of space that corresponds to the display screen of a computer. If the information elements displayed on the screen is fixed, then analysis programs can easily determine the relationship of the recorded eye gaze data to the displayed elements.

However, the very nature of hypermedia results in very frequent changes in the user's display screen, thereby greatly limiting the application of present eyetracking technology. Typically, the user must be restricted in the actions he/she performs. For instance, the use of scroll bars would be disallowed since their use would instantly change the position of the elements and thereby render the recorded coordinates inaccurate. Otherwise, researchers must tediously analyze the eyetracking data manually from video recordings of the user to infer the relationship of eyetracker coordinates to the content that had been displayed or templates describing the location of display elements must be changed by hand every few seconds. Consequently, eye-tracking research on hypermedia such as the WWW requires a time investment that is too high for hypermedia experts.

This hand analysis can be facilitated by providing a scene by scene (or screen by screen) data file or by providing tools that permit the analyst to define and label spatial areas corresponding to areas of displayed content. In the Borah patent noted above, eyetracking is used to measure individual's interest in distinct visual areas of different television scenes. Point of gaze data is compared with a scene by scene data file to produce a third data file showing a mean distribution of viewer looking time for each selected scene. However, in Borah's invention, the scene data file must be produced manually and thus, a very significant amount of manual effort is required and there is no access to the semantic content of the regions. Analogously, a template of defined content areas can be specified for each display state, for example for each and every view of WWW pages visited by a user to thereby allow more expedited data processing. However, as the number of screen changes increases, so does the number of templates required for analysis. In the case of a Web browser, a new template would be required for each page, and, in fact, for each possible position of the scroll bar for each page. Thus, such solutions is not practical or economical.

Recently, a method has been proposed for presenting high level interpretations of eye tracking data which is correlated to saved display images in U.S. Pat. No. 6,106,119 to Edwards. The Edwards patent discloses a method that stores eye tracking data and correlated display scenarios based on a predetermined condition such as time interval, tracking sequence, a scrolling detection or other activity. Edwards teaches the conversion of the eye tracking data into high level interpretations and assigning a valuation vocabulary to these interpretations. The stored display scenarios are then displayed together with the valuation vocabulary. Thus, the invention of Edwards discloses superimposing eyetracking data over screen shots and teaches techniques for determining when to capture the screen shots. Moreover, the invention of Edwards addresses applicability to hypermedia such as webpages and addresses the problems caused by scrolling by detecting scroll events and taking screen shots before and after the scrolling by the user.

However, the invention disclosed in Edwards reference has been found to only provide a limited advantage to the known prior art eyetracking methods. As previously noted, because the output provided in Edwards is interpreted eyetracking data superimposed over screen shots, a human analyst must then perform the points-to-elements mapping by observing and analyzing the screen shots with the eyetracking data superimposed thereon to identify what elements are beneath the eyetracking data. Thus, a significant amount of human effort is still required to obtain the element-of-regard information. Moreover, because the screen shots as taught in the Edwards reference are merely graphical representations, no additional data processing can be made with the data obtained. For instance, in accordance with the teachings of Edwards, a human analyst would be required to determine a user's eye movements to a particular element, image, link, text or formatted text, etc. Edwards does disclose use of templates that can aid in identifying the elements during the analysis of the eyetracking data. However, a significant amount of human effort must be expended to create such templates and a new template would be needed for every screen displayed which makes the proposed solution unworkable in a hypermedia context where the screen displayed changes constantly.

All documents cited herein, including the foregoing, are incorporated herein by reference in their entireties.

SUMMARY OF THE INVENTION

The present invention provides an improved system and method for analyzing eyetracker data collected from a user viewing display of dynamic hypermedia pages.

Additionally, with the present invention human analyst interaction and effort is minimized and points-to-element mapping can be substantially automated.

The system and an information storage media for analyzing eyetracker data collected from a user viewing a display of dynamic hypermedia pages through a browser having an object model interface includes an eyetracker, a logging tool and a mapping tool. The eyetracker monitors location and time of the user's gaze, and stores eyetracker data of the location and time of the user's gaze in an eyetracker data file. The logging tool monitors the displayed pages and stores content of the displayed pages into a memory. The mapping tool receives the eyetracker data from the eyetracker data file, processes the eyetracker data into fixation data indicative of the user's interest, and restores the displayed pages from the memory. The mapping tool also maps the fixations data onto the restored pages to thereby identify elements-of-regard upon which the user fixated and locations thereof, and stores the identified elements-of-regard and the locations thereof in an elements-of-regard database. The fixation data is at least one of information regarding fixation points at which the user's gaze becomes fixated, information regarding an area proximate to a fixation point that is contained within a bounding box, or information regarding a transition which is a cluster of fixation points related to one another by a predetermined algorithm. The mapping tool may also accesses the object model interface of the browser to identify elements of the restored pages and stores the identified elements of the restored pages in an elements database. The logging tool may also monitor and store events and time data of the events that cause a change in the pages displayed into an event log, and may restore the displayed pages from the memory and the events data in the event log by reenacting the events of the event data on the restored pages. The mapping tool may also time synchronize the fixation data to the events data in the event log, and may calibrate a coordinate system of the eyetracker data stored in the eyetracker data file to a screen coordinate system used in viewing the display of dynamic hypermedia pages. The logging tool and the mapping tool may be software programs that are stored in an information storage media.

In accordance with another embodiment, method for analyzing data collected from a user viewing a display of dynamic hypermedia pages through a browser having an object model interface is provided including monitoring location and time of the user's gaze, storing the location and time as eyetracker data, processing the eyetracker data into fixation data indicative of the user's interest, monitoring content of the displayed pages and storing content of the displayed pages into a memory, restoring the displayed pages from the memory, mapping the fixations data onto the restored pages to thereby identify elements-of-regard upon which the user fixated upon and locations thereof, and storing the identified elements-of-regard and the locations thereof in an elements-of-regard database. In accordance with an embodiment, the method also includes accessing the object model interface of the browser to identify elements of the restored pages and storing the identified elements of the restored pages in an elements database. The method may also include monitoring and storing events and time data of the events that cause a change in the pages displayed as event data. The displayed pages may be restored from the memory and the events data by reenacting the events of the event data on the restored pages. The present method may also include time synchronizing the fixation data to the events data as well as calibrating a coordinate system of the eyetracker data to a screen coordinate system used in viewing the display of dynamic hypermedia pages.

In accordance with still another embodiment of the present invention, a system and information storage media for analyzing eyetracker data collected from a user viewing a display of dynamic hypermedia pages through a browser having an object model interface is provided including an eyetracker, a logging tool, and a mapping tool. The eyetracker monitors location and time of the user's gaze, and stores eyetracker data of the location and time of the user's gaze in an eyetracker data file. The logging tool monitors the displayed pages and stores content of the displayed pages into a memory. The mapping tool receives the eyetracker data from the eyetracker data file, processes the eyetracker data into fixation data indicative of the user's interest, and restores the displayed pages from the memory. The mapping tool also maps the fixations data onto the restored pages. The mapping tool accesses the object model interface of the browser to identify elements of the restored pages and stores the identified elements of the restored pages in an elements database. The fixation data is at least one of information regarding fixation points at which the user's gaze becomes fixated, information regarding an area proximate to a fixation point that is contained within a bounding box, or information regarding a transition which is a cluster of fixation points related to one another by a predetermined algorithm. The logging tool may also monitor and store events and time data of the events that cause a change in the pages displayed into an event log. The mapping tool may restore the displayed pages from the memory and the events data in the event log by reenacting the events of the event data on the restored pages. In other embodiments the mapping tool may also time synchronize the eyetracker data to the events data in the event log and also may calibrate a coordinate system of the eyetracker data stored in the eyetracker data file to a screen coordinate system used in viewing the display of dynamic hypermedia pages.

In accordance with yet another embodiment of the present invention, a method for analyzing data collected from a user viewing a display of dynamic hypermedia pages through a browser having an object model interface is provided including monitoring location and time of the user's gaze, storing the location and time as eyetracker data, processing the eyetracker data into fixation data indicative of the user's interest, monitoring content of the displayed pages and storing content of the displayed pages into a memory, restoring the displayed pages from the memory, mapping the fixations data onto the restored pages, accessing the object model interface of the browser to identify elements of the restored pages, and storing the identified elements of the restored pages in an elements database. The method may also include monitoring and storing events and time data of the events that cause a change in the pages displayed as event data. The displayed pages may be restored from the memory and the events data by reenacting the events of the event data on the restored pages. In addition, the method may also include time synchronizing the fixation data to the events data and calibrating a coordinate system of the eyetracker data to a screen coordinate system used in viewing the display of dynamic hypermedia pages. (Use the term "may" when the statement could refer to a dependent type claim.)

BRIEF DESCRIPTION OF THE DRAWINGS

FIG. 3 illustrates Table 1 that details the event log schematic in accordance with one embodiment of the present invention;

FIG. 4 is a partial output of an element database in accordance with one embodiment of the present invention; and FIG. 5 is a partial output of an element-of-regard database in accordance with one embodiment of the present invention.

DETAILED DESCRIPTION OF THE INVENTION

As will be evident from the detailed description herein below, the present invention provides an improved system and method for analyzing eyetracker data collected from a user viewing the display of dynamic hypermedia pages. The described invention minimizes human analyst interaction and effort by allowing substantial automation of points-to-elements mapping that may be used to identify elements that were fixated upon by the user, or to identify content around the elements. It will also become evident that the present system and method will allow extensive data analysis based on the data obtained because the present invention determines the contents of the display elements.

The present applicants have recognized that better technology and techniques is required to analyze and better understand how a user's attention and actions are affected by different aspects of a hypermedia such as webpages (or "website") of the World Wide Web ("WWW", "web", or "Internet"). If such data and information can be readily obtained, the functionality of the hypermedia can be significantly improved and be better designed. For instance, such data and information, if readily obtainable, could be used to answer questions such as:

Do users attend first, or more often to elements of one type vs. another? For instance, do users look at image maps first or more often than textual link anchors? Does this vary depending on the user's specific goals and/or the specific site?

Do users who are attempting to perform some operation, such as checking out a purchase at a website, see the "help" link when they are confused?

Does one version or placement of an advertisement more attention than another? Does one more frequently result in a subsequent desirable action than the other?

What is the optimal ratio of space taken up by links verses the "white space" on a webpage?

What words does a user look at, or fail to see, when they are engaged in a given task?

Is one arrangement of words better than another?

In order to allow acquisition of such data and information, it would be necessary to develop a way to record and analyze the user's attention to elements or objects of hypertext in a web page, even though the pages may frequently be changing and portions of a page may come in and out of user's visibility through scrolling. Consequently, researchers, engineers, designers, testers and marketers of hypermedia have become interested in technologies that can record how a user attends to hypermedia and the actions they perform during interaction. However, an effective solution to attain this objective has not been found, the primary problems being discussed below.

Figure 1:
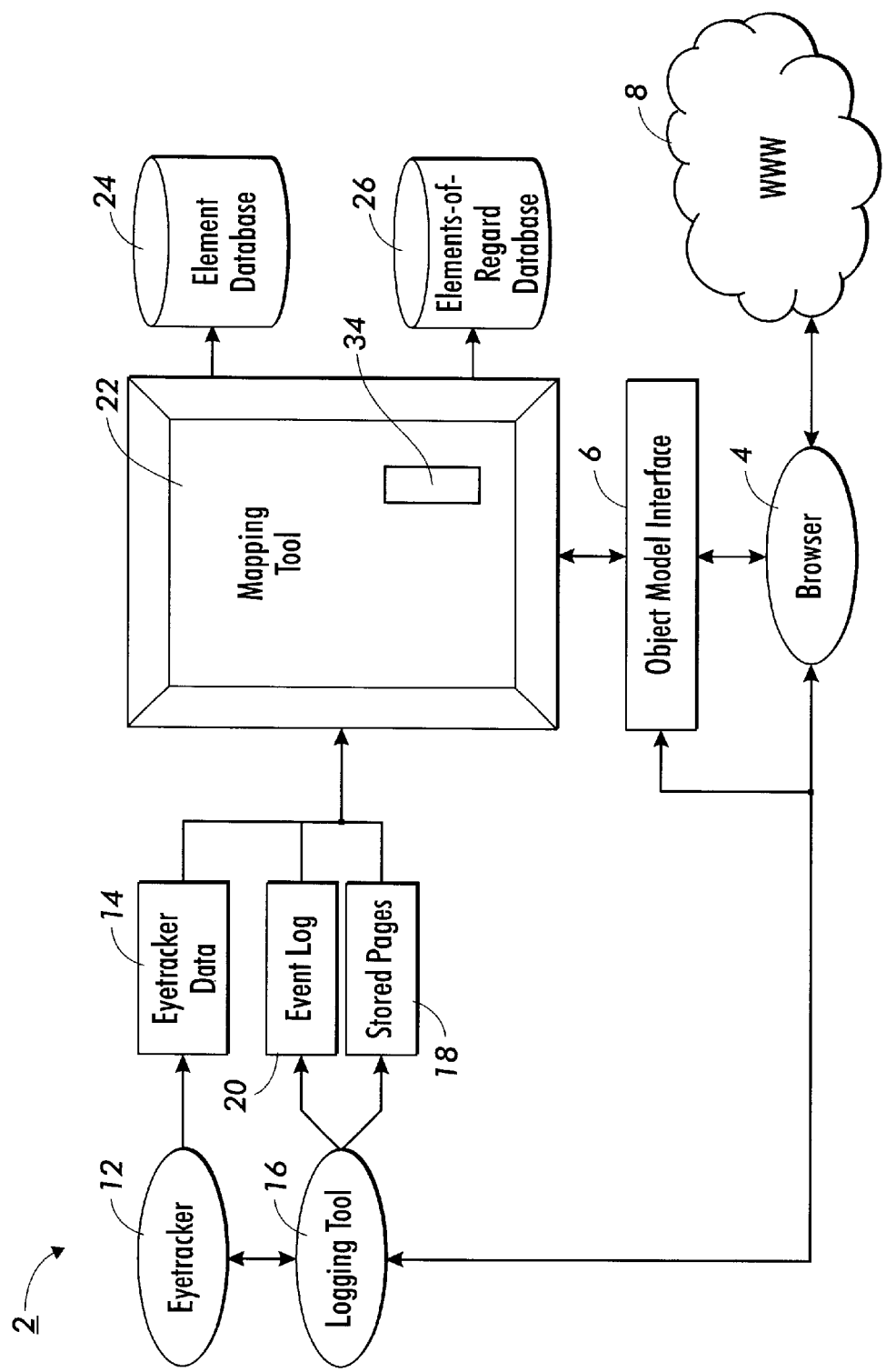
FIG. 1 is a schematic illustration of a system for analyzing eyetracker data in accordance with one embodiment of the present invention.

FIG. 1 shows a schematic illustration of a system 2 for analyzing eyetracker data in accordance with an embodiment of the present invention. It should initially noted that the system 2 is shown in FIG. 1 in a schematic representative form because in accordance with the embodiment, the various elements of the system 2 are software implemented on a general computer or other processing unit. This should be evident to one of ordinary skill in the art of computers and software in view of the discussion below. However, it should be noted that the present invention may also be implemented in hardware or hardware/software. The eyetracker data that is analyzed is collected during a browsing session from a user viewing a display screen such as a monitor (not shown) displaying dynamic hypermedia pages such as a web page in the World Wide Web through a browser 4 such as the Microsoft's® Internet Explorer® that includes an object model interface 6 such as Microsoft's® Component Object Model (COM) interface also discussed in further detail below as it relates to the present invention. In this regard, the present invention is described herein below as applied to the World Wide Web 8 ("WWW", "Web" or "Internet") where it is especially applicable. However, it should be appreciated that the present invention may also be applied to other applications. Moreover, whereas the embodiment of the present invention utilizes Microsoft's® Internet Explorer® for the browser 4 and Microsoft's® COM interface for the object model interface 6 specifically, other commercially available or proprietary browsers and/or object model interfaces may be readily used as well.

As can be clearly seen, the system 2 also includes an eyetracker 12, a logging tool 16, and a mapping tool 22. The eyetracker 12 monitors location and time of the user's gaze, and stores the eyetracker data in an eyetracker data file 14, the eyetracker data providing the points-of-regard information, i.e. information indicative of the user's gaze as the user views a display of dynamic hypermedia pages such as web pages on the display screen. Of course, as noted previously, the present invention need not be used exclusively for analyzing data of web pages but may also be used for other applications such as other hypermedia applications. The eyetracker data in the eyetracker data file 14 may be gathered in any appropriate manner, for instance, by utilizing devices and techniques discussed previously and known in the art and thus, are not discussed in further detail here.

The logging tool 16 of the present invention monitors and stores or "logs" the content of the web pages displayed on the display screen via the browser 4 into a memory 18. The logging tool 16 may be a computer implemented software program or a software module therein which executes the functions of monitoring and storing the content data of the pages into the memory 18. In this regard, the logging tool 16 may it self be stored in an information storage media such as any variations of magnetic, optical and solid state memories including optical disks, floppy disks, and even be downloadable files in a hard drive of a computer accessible via a network. The memory 18 may be any data storage device or allocations therein including any variations of magnetic, optical and solid state memories such as a hard drive of a computer. In the embodiment, the memory 18 is an allocation in a hard drive of a computer executing the logging tool 16. In the illustrated embodiment, the logging tool 16 also monitors and stores events and time data of the events that cause a change in the pages displayed into an event log 20 which is a text file also provided on an allocation in the hard drive of the computer executing the logging tool 16. These events can include scrolling of the pages, launching of links and other elements displayed on the pages, as well as any other actions that cause change in the pages displayed.

As can be seen in FIG. 1, mapping tool 22 accesses the above described object model interface 6 of the browser 4, the eyetracker data stored in the eyetracker data file 14, the stored pages in memory 18 and the event log 20 to thereby allow substantial automation of the points-to-elements mapping in the manner described herein. In particular, the mapping tool 22 receives the eyetracker data of the eye-tracking data file 14, performs a fixation mapping which processes the eyetracker data into fixations data that allows identification of the elements and/or objects of the user's interest, i.e. elements-of-regard. It should be noted that the term fixations data is used herein to broadly mean any information derived from the eyetracking data, including information derived from any level of analysis of the eye-tracking data. In this regard, the term fixations data may be information regarding the actual fixation points at which the user's gaze becomes fixated (which indicates the user's interest), information regarding an area proximate to the fixation point that is contained within a bounding box, or information regarding a transition which is essentially a cluster of fixations related to one another by a predetermined algorithm. Thus, it should be kept in mind in reviewing the detailed discussion below that the term fixations data are used herein below to broadly mean any information derived from the eyetracking data.

The mapping tool 22 generates a fixations data list 34 having the fixations data which is derived from the eye-tracking data as described above. When the eyetracker data is to be analyzed, the mapping tool 22 restores the web pages to precisely those viewed by the user during the viewing session. In particular, this is attained by loading the stored pages of memory 18 into the browser's 4 cache memory and executing the event log 20 via the object model interface 6 of the browser 4 to thereby provide a precise "playback" of what was viewed by the user. Of course, provisions are provided so that the analyst utilizing the present system 2 can control the playback of the restored pages. If the playback were rendered by again directly accessing the web pages through the WWW, inaccurate playback may occur if the web page has changed, such change being a common occurrence in such dynamic hypermedia pages. Moreover, whereas browsers 4 typically have (or allocate) a cache memory for storing accessed web pages, such memory is not secure and may be easily overwritten. Thus, by restoring the web pages from memory 18, the potential for inaccurate playback due to either of these factors is thereby eliminated.

The mapping tool 22 also identifies elements of the pages restored in the manner discussed above by accessing the object model interface 6 of the browser 4, and stores the identified elements and the specific information related thereto in an element database 24. This is readily attained by accessing the object model interface 6 of the browser 4, which provides the content information for each of the elements rendered. The "elements" referred to herein are the application-level semantic objects of interest of the user which are generally the HTML elements that the browser 4 renders on the display. These semantic objects include text, images, hyperlinks, buttons, input boxes, etc. Like the logging tool 16, the mapping tool 22 may be a computer implemented software program or a software module therein which executes the functions described herein, the software program being stored in an information storage media such as any variations of magnetic, optical and solid state memories including optical disks, floppy disks, and even be downloadable files in a hard drive of a computer accessible via a network.

Furthermore, the mapping tool 22 maps the fixations data from the fixations data list 34 described above onto the restored display to thereby indicate where the user's gazed was focused upon on the display screen. Various information regarding the mapped fixation is stored in an elements-of-regard database 26, such as a record for each of the fixation points of the user during the browsing session, or any other information derived from the eyetracker data. In the embodiment where fixation points are contained in the fixations data list 34, the various information regarding the mapped fixation includes time and duration of the fixation as well as the location of the fixation in relevant coordinate systems, these being discussed in further detail below. Thus, the present invention substantially automates the point-to-element mapping which has not been previously attained. By correlating the elements-of-regard database 26 with the element database 24 discussed above utilizing tools such as database programs, the present invention enables the analyst to quickly and easily determine exactly what elements the user fixated upon (i.e. the actual elements-of-regard) without manually reviewing the display screens as required in the prior art systems and methods. Moreover, because the content and properties of the element (such as its HTML or XML tag name, its bounding box on the screen, its text, its bitmap, and the URL) is recorded, this data may be further searched, sorted or otherwise analyzed to obtain relevant information that will address the questions posed previously.

It should also be evident that the present invention takes advantage of browsers 4 such as the Microsoft Internet Explorer® that provides properties of display elements in symbolic form through object model interface such as the COM interface. The present invention accesses the semantic content of the elements to thereby allow substantially automatic determination of the elements-of-regard and further allows data analysis to determine desirable information such as typeface and content of a word.

The present invention provides an improved system and method for analyzing eyetracker data which will minimize human analyst interaction and effort by allowing substantial automation of points-to-elements mapping that may be used to identify elements-of-regard. The present invention also allows extensive data analysis based on the data obtained because it determines the contents of the display elements. However, due to the relatively high level of computational resources required to allow the user to view the display of dynamic hypermedia pages and to record and analyze and record the eyetracker, it is envisioned that in an alternative embodiment of the present invention, a separate stimulus computer for viewing the display be provided separate from the eyetracking computer so that viewing and/or collection of data is not inhibited. Optionally, a separate computer or processor may also be used to implement the mapping tool. However, if two or more computers are utilized to implement the above described embodiment of the present invention, special problems arise since the precise time and location of the user's gaze is monitored and recorded by one computer whereas the dynamic hypermedia page is viewed and recorded in another computer. In particular, the coordinate systems of the eyetracker and the display of the stimulus computer are most likely not the same. Moreover, time information between the different computers is also not likely to be the same so that precise restoration of the displayed pages is not possible.

In such an embodiment, the mapping tool 22 calibrates the coordinate system of the eyetracker data stored in the eyetracker data file 14 to the screen coordinate system of the display screen used to view the pages of the dynamic hypermedia. This calibration allows the mapping tool 22 to precisely position the locations of the user's gaze as well as the elements displayed on the web page despite the fact that separate computers are used. The mapping tool 22 further synchronizes time in the data provided by the separate computers so that precise restoration of the display is made possible.

The above discussion generally describes the present invention in sufficient detail for one of ordinary skill in the art of computers and computer science to practice the present invention. However, to further describe the features of an embodiment of the present invention in which separate computers are used for viewing and eyetracking, additional specific details are set forth herein below. As will be evident, the present invention as discussed below provides further details regarding the present invention together with various solutions to the above noted problems in attaining points-to-elements mapping in applications using more than one computer.

Browser and Object Model Interface

Figure 2:
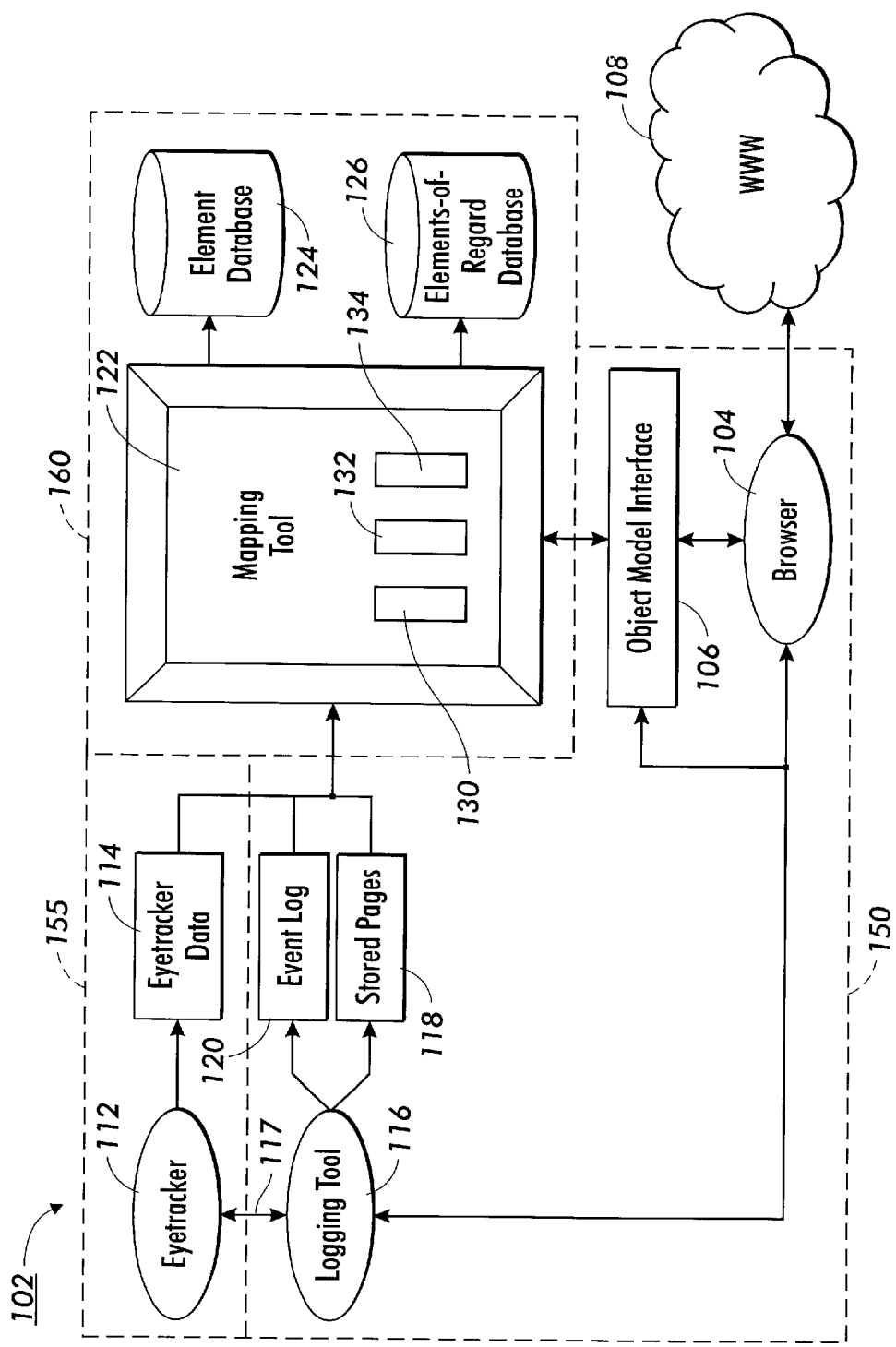
FIG. 2 is a schematic illustration of a system for analyzing eyetracker data in accordance with another embodiment of the present invention.

FIG. 2 illustrates another embodiment of the system 102 for analyzing eyetracker data collected from a user viewing the display of dynamic hypermedia pages, wherein more than one computer is used. As can be seen, a web study with eyetracking is performed by monitoring and eyetracking a user during a browsing session during which the user views a display of dynamic hypermedia pages through a browser 104. A stimulus computer 150 is used to provide the user with WWW 108 access so that the user can browse the Web. The user views various web pages through the browser 104 such as Microsoft Internet Explorer® on a computer display of the stimulus computer 150. As well appreciated in the art, the browser 104 changes the display in response to user's actions such as navigating to different web pages and/or scrolling. The application-level semantic objects of interest of the user are the HTML or XML elements that the browser renders on the display of the stimulus computer including text, images, hyperlinks, buttons, input boxes, etc.

The logging tool 116 and the mapping tool 122 in accordance with an embodiment of the present invention work in tandem with the browser 104 such as Microsoft®'s Internet Explorer® that has an object model interface 106. The Internet Explorer® provides a great deal of functionality to other pieces of software through Microsoft®'s Component Object Model (COM) technology. COM technology allows independent software objects (i.e. applications or sub-application widgets) to communicate through a software interface. In this regard, the present invention is described as being implemented for utilizing Microsoft®'s COM technology but it should be noted that other object models such as CORBA may also be used in practicing the present invention.

Since Microsoft®'s COM technology is most easily exploited by applications written in Visual Basic, in an embodiment, the logging tool 116 and the mapping tool 122 are both written in Visual Basic. The browser's 104 COM interface 106, like the COM interface of any software that supports COM, includes a list of methods, properties, and events. Methods are functions which other pieces of software can tell the browser 104 to execute such as navigation to a web page, scrolling the browser window, clicking on the Internet Explorer® window, typing in the Internet Explorer® window, and moving the window. Properties are Internet Explorer®'s data members whose values can be set or accessed by other pieces of software such as the Uniform Resource Locator (URL) of the web page currently displayed, window size and position, and the position of web page elements relative to the Internet Explorer®'s window. Events allow other software to monitor the browser since the Internet Explorer® fires events for certain occurrences during its execution. The browser 104 such as the Internet Explorer® fires events when it starts and finishes navigating to a web page, when it starts and finishes loading a web page, when a user scrolls, clicks, or types on a page, and when a user moves or resizes the browser window. As will be discussed in further detail herein below, the present invention utilizes these methods, properties, and events components of the object model interface 106 (such as Microsoft®'s COM) to restore the page displayed, to map the user's gaze, and to extract the symbolic representation of the displayed elements to thereby allow substantially automated identification of the elements-of-regard.

Eyetracker

The user's gaze is monitored and analyzed using a variety of instruments, including an eyetracker 112 which are known in the art. A typical configuration for an eyetracker 112 includes a desk-mounted camera which sends an image of a user's eye to a dedicated eyetracker computer which is separate from the stimulus computer which the user views during the browsing session. Again, this is due to the relatively high level of computational resources required to analyze and record the user's gaze data. However, as computational power and capacity continues to increase, the same computer may be used, as described above relative to the first discussed embodiment. The eyetracker 112 monitors and analyzes the user's gaze and to store at least the location and the time of the user's gaze (i.e. the point-of-regard) to the eyetracker data file 114 every $1/60^{th}$ of a second. The stored eyetracker data can then be analyzed in accordance with the present invention.

Logging Tool

As described previously above, the logging tool 116 of the present invention monitors and stores or "logs" information such as the content of the web pages displayed by the browser 104 into memory 118. As can be seen, in the present embodiment, the logging tool 116 is implemented in the stimulus computer 150 which is separate from the eyetracker computer 155. Because of the ever-changing nature of the dynamic hypermedia pages such as web pages, the availability of the exact same web page in the exact form displayed by the browser 104 cannot be guaranteed when these pages need to be restored to map the eyetracking data or fixation data derived therefrom. Thus, by actually saving the content of the web pages displayed by the browser 104 into memory 118, this availability of the exact same web pages is ensured. In this embodiment, this monitoring and storing of the content of the web pages is easily attained by copying the content stored in browser's local disk-based cache into a "safe" directory such as the memory 118 of the logging tool 116 where the contents cannot be easily overwritten.

The logging tool 116 also monitors and stores events and time data of the events that cause a change in the web pages displayed into an event log 120. The event log 120 is a text file that is in a format which can be easily imported into a standard database program. In an embodiment of the present invention, the logging tool 116 records for each event, the event name, event specific parameters, and the time of the event in four different formats: total elapsed experiment time, time since last event, time of day in machine-readable format, and time of day in human-readable format. The database schema for each event that is used in generating the event log 120 in accordance with the present embodiment are set forth in Table 1: EVENT LOG SCHEMA of FIG. 3. Thus, the logging tool 116 stores the predetermined event names as set forth in FIG. 3 into the event log 120 upon an occurrence of the corresponding event. As previously noted, these events include events that change the web page being displayed (including navigating or downloading), the portion of the page being displayed (such as scrolling), or the position and/or size of the browser 104 window relative to the display screen, as well as events related to spatial calibration and time synchronization discussed in further detail below.

In addition to the above, the logging tool 116 also has a built-in calibration point feature that works in tandem with the eyetracker's 112 own calibration procedure. During the spatial calibration procedure, the logging tool 116 draws a calibration point on the display screen (at opposite corners in this example) so that the user can gaze and fixate upon them. The analyst utilizing the present system 102 then indicates to the eyetracker 112 that the user is fixating on a drawn calibration point. The eyetracker 112 then sends to the logging tool 116, the coordinates of the calibration point to the logging tool 116 in the eyetracker coordinate system. This sending of the coordinates may be attained through a serial port connection 117 or other data connection. Since the logging tool 116 actually draws the calibration point, it already knows the coordinates of the point in the screen coordinate system. When the logging tool 116 receives the coordinates of the calibration point in the eyetracker coordinate system, it writes an event EYETRACKER-CALIBRATION for each of the calibration points to the event log 120 indicating the eyetracker and screen coordinates of the calibration points. This provides the calibration points which can then be used to properly restore the displayed pages in memory 118 and to map the eyetracker data or the fixation data derived therefrom, these aspects being further elaborated below.

Moreover, the logging tool 116 also has a built-in time synchronization point feature in which a numerical marker is added to the eyetracker data file 114 to allow time synchronization between the stored pages in memory 118, the event log 120, and the user's gaze information in the eyetracker data file 114. In particular, the logging tool 116 sends a numerical marker such as a number every predefined period of time (such as one second or other time increment) to the eyetracker 112. The numerical marker is incremented by one (or other increment) each time it is sent by the logging tool 116 and is recorded as time information in the eyetracker data file 114 by the eyetracker 112. The sending of the numerical marker is also recorded as an EYETRACKER-SYNC event in the event log 120. This transmission of the numerical marker from the logging tool 116 to the eyetracker 112 may be attained through the same serial port connection 117 or other data connection utilized for the above described spatial calibration. Again, this time synchronization point feature allows time synchronization between the two computers so that properly restoration of the displayed pages and mapping of the eyetracker data or the fixation data derived therefrom may be attained, these aspects being further elaborated below.

Mapping Tool

As described above, the mapping tool 122 as shown in FIG. 2 accesses the above described object model interface 106 of the browser 104, the eyetracking data stored in the eyetracker data file 114, the stored pages in stored in memory 118 and the event log 120 as provided by the logging tool 116 to thereby allow points-to-elements mapping. Because of the computer resources required to implement to mapping tool 122, the present embodiment implements the mapping tool 122 in separate computer 160. Of course, it should be noted that the mapping tool 122 may also be implemented in the same computer as the logging tool 116 or even the eyetracker 112 since the mapping is done subsequent to obtaining of the eyetracker data and the event data, and subsequent to storing the displayed pages. Other implementations of the mapping tool 122 are also possible such as in a server/client network or distributed or parallel processing. As previously explained, once the viewing session and data gathering is over and the eyetracker data is to be analyzed, the mapping tool 122 performs a fixation analysis and then restores the web pages to precisely those viewed by the user during the viewing session in the manner previously described relative to the first embodiment. In addition, as also previously described, the mapping tool 122 also identifies elements of the pages restored in the manner discussed above by accessing the object model interface 106 of the browser 104, and stores the identified elements and the specific information related thereto in an element database 124. Again, this is readily attained by accessing the object model interface 6 of the browser which provides the content information for each of the elements rendered. Moreover, the mapping tool 122 further processes the available data to provide an elements-of-regard database 126 as set forth below. Lastly, the mapping tool 122 also performs spatial calibration and time synchronization which are discussed in further detail herein below. These and other considerations with respect to the present invention are more fully addressed herein below.

Fixation Point Analysis

As noted previously, the term fixations data is used herein to broadly mean any information derived from the eyetracking data, including information derived from any level of analysis of the eyetracking data. In the embodiments of the present invention where the eyetracking data is either the fixation points at which the user's gaze becomes fixated or the area around the fixation points, the fixation points need to be determined from the points-of-regard data which is provided by the eyetracker 112. In this regard, fixation is usually said to have occurred when the user's eye's gaze stays within a certain small area for a certain minimum time duration to thereby ensure that the user's gaze is in fact focused on an element of interest for the user. However, it should be recognized that the criteria for determining eye fixation can vary in the art of eyetracking and different criteria may be used in practicing the present invention. Thus, after the mapping tool 122 is provided with the eyetracker data stored in the eyetracker data file 114 as input, the mapping tool performs fixation analysis to provide fixation data which stored in the fixations data list 134 that is later used. In addition, it should be noted that the above described fixation point analysis may not be necessary in other embodiments of the present invention where the eyetracking data is processed to a higher level such as the transitions described previously where information is obtained regarding a cluster of fixations related to one another by a predetermined algorithm.

Spatial Calibration

As described above, the fixation analysis by the mapping tool 122 converts the eyetracking data of the eyetracker data file 114 into fixation data of the fixation data list 134. Again, the fixation data is any information derived from the eyetracker data, whether it be information regarding the fixation points, area proximate to the fixation points, or transitions. However, the resulting fixation data is still in the eyetracker's 112 own two-dimensional coordinate system. In order to understand how these data relate to the elements on the separate stimulus computer's display at which the user was actually looking, the mapping tool 122 of the present invention performs spatial calibration in which the fixation data is converted from the eyetracker's 112 coordinate system to the display screen's coordinate system.

This spatial calibration is attained with calibration points provided to the eyetracker 112 and to the event log 120 by the logging tool 116 as described previously. The mapping tool 122 is provided with a log file parser 130 that is adapted to parse the event log 120, and also a data parser 132 to parse the eyetracker data file 114. More specifically, the log file parser 130 of the mapping tool 122 finds two EYETRACKER-CALIBRATION events for calibration points at opposite corners of the display screen that was recorded in the event log 120 during the eyetracker 112 calibration discussed previously, and provides the coordinates of these calibration points in the display screen coordinate system. Similarly, the data parser 132 finds the corresponding coordinates to the two calibration points in the eyetracker 112 coordinate system that was recorded in the eyetracker data file 114 during the eyetracker 112 calibration. It should be noted that the log file parser 130 and the data parser 132 in the present embodiment are software modules provided in the mapping tool 122. Of course, it should be recognized that these parsers may also be separate programs apart from the mapping tool 122. With two (or more) of such calibration points known and identified, the mapping tool 122 can convert any point from the eyetracker 112 coordinate system to a point in the display screen's coordinate system according to the following coordinate system conversion formulas:

$$x_2 = (x_1 - X_{A1})\left(\frac{X_{A1} - X_{B1}}{X_{A2} - X_{B2}}\right) + X_{A2} \quad (1)$$

and $$y_2 = (y_1 - Y_{A1})\left(\frac{Y_{A1} - Y_{B1}}{Y_{A2} - Y_{B2}}\right) + Y_{A2} \quad (2)$$

where $(x_1, y_1)$ is an arbitrary point in Coordinate System 1 (for instance, in this case, the eyetracker's 112 coordinate system), $(X_{A1}, Y_{A1})$ and $(X_{B1}, Y_{B1})$ are distinct calibration points in Coordinate System 1, and $(X_{A2}, Y_{A2})$ and $(X_{B2}, Y_{B2})$ are the corresponding calibration points in Coordinate System 2 (for instance, in this case, the display screen coordinate system). The point $(x_2, y_2)$ is the conversion of $(x_1, y_1)$ into Coordinate System 2. It should be noted that with respect to the above provided conversion formulas, both of the coordinate systems should be oriented the same way. Thus, for example, the eyetracker 112 and the display screen coordinate systems should both have positive axes extending to the right and down from the origin. Furthermore, it should also be noted that other conversion techniques and/or formulas may be used in conjunction with the present invention and the above specific conversion formulas are merely provided as the formulas for obtaining the conversion of the coordinate systems. Thus, the mapping tool 122 effectively utilizes the calibration points in the coordinate system provided by the logging tool 116 and conversion formulas such as those provided and discussed above to thereby convert points from the eyetracker's 112 coordinate system to the display screen coordinate system.

Time Synchronization

In accordance with the present embodiment of the invention, the eyetracker 112 begins outputting eyetracker data (i.e. points-of-regard) when the eyetracker 112 is operated or otherwise instructed to begin recording. However, as can be appreciated by one skilled in the art, the time at which the eyetracker 112 begins outputting the eyetracker data does not necessarily correspond to the beginning of the browsing session by the user. This can occur in the present embodiment because the eyetracker 112 is implemented on a different computer than the logging tool 116 which is implemented on the stimulus computer where the browsing session occurs. In addition, this can also occur in the circumstance where the beginning of use of the eyetracker 112 and the logging tool 116 are not simultaneous. Consequently, the time information in the fixations data from fixation analysis discussed above are relative to the beginning of eyetracker's 112 recording, while times of events in the event log 120 are relative to the beginning of the browsing session. To accurately map the fixation data to the restored pages, the fixation data must be matched in time with the events in the event log 120 from the browsing session.

This time synchronization of the fixation data with the browsing session is attained by utilizing the time synchronization points (i.e. point in time of a numerical marker described previously) in the eyetracking data file 114 that corresponds in time to some known event from the browsing session. In this regard, the mapping tool 122 uses the log file parser 130 to find a numerical marker for an EYETRACKER-SYNC event stored in the event log 120, and also uses the data parser 132 to find the matching numerical marker in the eyetracker data file 114. The EYETRACKER-SYNC event and the matching numerical marker are used to align both the fixation data and the browsing session event times to the same clock, referred to herein as "simulation clock". The simulation clock's zero point corresponds to the beginning of the browsing session so that time data from browsing session events are already aligned with the simulation clock. The time alignment of the fixation data with the simulation clock is obtained using the synchronization points. By subtracting the time of the synchronization point in the browsing session data from the time of the synchronization point in the eyetracking data, a "synchronization base point" can be determined. The synchronization base point is the point relative to the beginning of eyetracking which corresponds to zero on the simulation clock, and thus, corresponds to the beginning of the browsing session. After determining the synchronization base point, the mapping tool 122 of the present embodiment converts the times for each fixation data into times on the simulation clock according to the formula:

$$t_{sc} = t_{et} - t_0$$

where $t_{sc}$ is the time of the fixation on the simulation clock, $t_{et}$ is the time of the fixation on the eyetracker clock, and to is the time of the synchronization base point relative to the beginning of eyetracking. In this manner, the fixation data is time synchronized with the browsing session so that each fixation data will be displayed and mapped to an element at the proper time on the simulation clock. Of course, in accordance with other embodiments of the present invention other techniques may be used as well which will attain the desired time synchronization.

State Restoration

As noted previously, the system 102 and the method in accordance with the present invention restores the pages displayed for a give time of interest and identifies the elements such as HTML elements that were rendered and where they were rendered on the display screen. To properly restore the pages displayed, the present invention "reenacts" each event that changed the display from the starting initial state, up to the instant of interest which can then be redisplayed in "playback". This is attained by the mapping tool 122 which utilizes the stored pages in the memory 118 and the record of the events that affected display as stored in the event log 120. It should be noted that this state restoration actually proceeds continuously as the simulation clock advances. Before the mapping tool 122 begins playback of the restored pages, the mapping tool takes the content of the stored pages in the memory 118 and restores it to browser's 4 cache. The mapping tool 122 then identifies the elements of the pages by accessing the object model interface 106 of the browser 104 such as Microsoft's® COM interface, and stores the identified elements and the specific information related thereto in the element database 124 as described in more detail below.

Thus, during playback, when the browser 104 accesses one of these pages, it is provided with the cached version which is identical to that viewed by the user previously during the browsing session instead of a version out on the WWW which may not be the same. After these initial steps, the analyst using mapping tool 122 can begin to advance the simulation clock to initiate playback. In this regard, provisions are provided so that the analyst utilizing the present system 102 can control the playback of the restored pages through the control of the simulation clock or by other means. In this regard, the simulation clock operates in units of milliseconds since 1 ms is a lower bound on the time difference between two events in the event log 120 or between two fixation points.

Fixation-to-Element Mapping

As previously noted, the term fixations data is used herein to broadly mean any information derived from the eyetracking data, including information derived from any level of analysis of the eyetracking data such as information regarding the actual fixation points, an area proximate to the fixation point, or a transition. The fixations data can then be mapped in accordance with the present invention to allow identification of the elements and/or objects of the user's interest, i.e. elements-of-regard. Once this fixations data is obtained and stored in the fixations data list 134, and it is determined how the fixations data match up in time and space with what was on the display screen viewed in the manner described above, the mapping tool 122 maps the fixations data from the fixations data list 134 onto the restored display to thereby provide information as to where the user's gaze was focused upon on the display screen. In accordance with an embodiment, this is attained by the mapping tool 122 which accesses the object model interface 106 such as the COM interface to Microsoft's® Internet Explorer® in the manner discussed previously to obtain element information described more fully below.

As the restoration and playback is continued by the analyst and the simulation clock advances, mapping tool 122 checks the next event in the event log 120 and the next fixation data in the fixations data list 134. If the current time of the simulation clock is equal to the elapsed time of an event stored in the event log 120, the mapping tool instructs the browser to "reenact" the event through methods and properties in object model interface 106. Corresponding to the events stored in the event log 120, the mapping tool 122 calls the appropriate methods. Thus, the methods for SCROLL-POSITION/ACTIVE-SCROLL events, WINDOW-POSITION/ACTIVE-MOVE events, and WINDOW-SIZE/ACTIVE-RESIZE events, are called to scroll, move, or size the browser window respectively. On DOCUMENT-COMPLETE events, the mapping tool 122 calls a method to have the browser 104 navigate to the URL stored as the parameter to the DOCUMENT-COMPLETE event.

If the current time of the simulation clock is equal to the time of the fixation data, the mapping tool 122 converts the coordinates of the fixation data into screen coordinates using the coordinate conversion formulas discussed previously. The mapping tool 122 then converts the screen coordinates into the browser 104 window coordinates, using the coordinate conversion formulas with the corners of the browser's 104 window (accessible through the object model interface 106 properties) as calibration points. With the window coordinates of the fixation data from the fixations data list 134, the mapping tool 122 can call one of the object model interface's 106 methods which returns a pointer to the web page element currently displayed at a specific point/location in the window. Once the mapping tool 122 has this pointer to the web page element, it can access properties of the element such as its HTML or XML tag name, its bounding box on the screen, its text (if a textual element), its bitmap (if an image), and the URL to which it leads (if a hyperlink).

Thus, this fixation-to-element mapping takes fixation data in screen coordinates as input, and outputs the location of the HTML or XML element (if any) that is rendered corresponding to the fixations data thereby identifying the element-of-regard. These outputs are stored in the element-of-regard database 126 discussed herein below.

Databases

The mapping tool's 122 primary output is a database that can be imported into a database program such as Microsoft® Access or other commercially available or proprietary database programs. In the present embodiment, the mapping tool 122 outputs two databases in the form of text files. More specifically, the mapping tool 122 outputs an element database 124 which contains the record of each HTML element on each displayed page viewed during the browsing session. In addition, the mapping tool 122 also outputs an elements-of-regard database 126 which contains a record for each eye fixation made during the browsing session.

Partial outputs of the element database 124 and the elements-of-regard database 126 in accordance with the one embodiment of the present invention are illustrated in FIGS. 4 and 5 respectively where the fixation data was the actual fixation points focused upon by the user. The sample of data 125 as shown in FIG. 4 contained in the element database 124 includes the following information for each element:

User ID

Task ID

URL

Local page location

Element ID number, unique for each element on a given page

HTML tag name

Element text

Left coordinate of upper-left corner of element bounding box, in logical page coordinate system Top coordinate of upper-left corner of element bounding box, in logical page coordinate system Width of element bounding box, in screen pixels Height of element bounding box, in screen pixels The sample of data 127 as shown in FIG. 5 contained in the element-of-regard database 126 of the same embodiment includes the following information for each element:

User ID

Task ID

Experiment date and time

URL

Local page location

Elapsed experiment time at start of fixation, in milliseconds

Fixation duration, in milliseconds

Element ID number in element database

Word fixated, if any

Horizontal coordinate, logical page coordinate system

Vertical coordinate, logical page coordinate system

Horizontal coordinate, screen coordinate system

Vertical coordinate, screen coordinate system

Horizontal coordinate, window coordinate system

Vertical coordinate, window coordinate system

Horizontal coordinate, eyetracker coordinate system

Vertical coordinate, eyetracker coordinate system

The elements displayed during in the browsing session that are stored in the element database 124, and the identified elements-of-regard in the elements-of-regard database 126 can then be correlated utilizing a database program such as Microsoft® Access or other commercially available or proprietary database program to thereby identify and output the elements upon which the user fixated or to identify other displayed objects of interest to the user. In this regard, the Element ID number that are stored in the elements-of-regard database 126 may be correlated to the element having the same Element ID number in the element database 124 to thereby output specific information related to the identified element as set forth in FIG. 4 discussed above. Thus, the present invention substantially automates the point-to-element mapping which has not been previously attained. By correlating the elements-of-regard database 126 with the element database 124 discussed above utilizing tools such as database programs, the present invention enables the analyst to quickly and easily determine exactly what elements the user fixated upon (i.e. the actual elements-of-regard) without manually reviewing the display screens as required in the prior art systems and methods.

Moreover, because the actual contents of the elements are stored within the element database 124, details and specific information regarding the elements are known and readily accessible for data analysis. Thus, whether a particular element is an image, link, text or formatted text, buttons, input boxes, etc. is known and the elements can be identified, sorted or otherwise analyzed based on such characteristics of the element. By providing accessible databases recording the user's visual fixation and action in relation to the type, content, and location of hypermedia elements, the system 102 for analyzing eyetracker data in accordance with the illustrated embodiment of the present invention makes possible extensive analysis of the recorded data to thereby provide valuable information and answers to questions posed previously. For instance, from the present invention, the mean attention time devoted to individual elements can be determined. By classifying elements according to type, for example, "headings" or "pictures", the amount of time devoted to different display element types can be determined. Furthermore, it can be determined whether users in certain situations noticed certain links. For example, it can be determined whether users who were unsuccessful at completing a purchase on the Web ever saw the link to a "help page". The present invention may also be used to determine how advertisement observation and duration vary as a function of placement on the page. Many similar analyses are possible.

From the foregoing, it should now be apparent to a person of ordinary skill in the art how the present invention provides an improved system and method for analyzing eyetracker data collected from a user viewing the display of dynamic hypermedia pages. It should also be apparent that the present invention minimizes human analyst interaction and effort by allowing substantial automation of points-to-elements mapping that may be used to identify elements of interest to the user. It should also be evident that the present system and method will allow extensive data analysis based on the data obtained because the present invention determines the contents of the display elements.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications which are encompassed by the claims.

What is claimed is:

1. A system for analyzing eyetracker data comprising:

an eyetracker that monitors location and time of the user's gaze, and stores eyetracker data of the location and time of the user's gaze;

a logging tool that monitors the displayed pages and stores content of the displayed pages into a memory, the logging tool monitoring and storing into an event log events and time data of the events that cause a change in the displayed pages; and a mapping tool that receives the eyetracker data, processes the eyetracker data into fixation data indicative of the user's interest, and restores the displayed pages from the memory and the events data in the event log by reenacting the events of the event data;

wherein the mapping tool maps the fixations data onto the restored pages to thereby identify elements-of-regard upon which the user fixated and locations thereof, and stores the identified elements-of-regard and the locations thereof.

2. The system for analyzing eyetracker data of claim 1, wherein the fixation data is at least one of information regarding fixation points at which the user's gaze becomes fixated, information regarding an area proximate to a fixation point that is contained within a bounding box, and information regarding a transition which is a cluster of fixation points related to one another by a predetermined algorithm.

3. The system for analyzing eyetracker data of claim 1, wherein the eyetracker data is collected from a user viewing a display of dynamic hypermedia pages through a browser having an object model interface, and the mapping tool accesses the object model interface of the browser to identify elements of the restored pages and stores the identified elements of the restored pages in an elements database.

4. A method for analyzing eyetracker data collected from a user viewing a display of dynamic hypermedia pages, the method comprising:

monitoring location and time of the user's gaze, and storing the location and time as eyetracker data;

processing the eyetracker data into fixation data indicative of the user's interest;

monitoring content of the displayed pages and storing content of the displayed pages into a memory;

monitoring events and time data of the events that cause a change in the displayed pages;

storing into an event log the events and corresponding time data that cause the change in the displayed pages;

restoring the displayed pages from the memory and the events data in the event log by reenacting the events of the event data;

mapping the fixations data onto the restored pages to thereby identify elements-of-regard upon which the user fixated upon and locations thereof; and storing the identified elements-of-regard and the locations thereof in an elements-of-regard database.

5. The method for analyzing eyetracker data of claim 4, wherein the fixation data is at least one of information regarding fixation points at which the user's gaze becomes fixated, information regarding an area proximate to a fixation point that is contained within a bounding box, and information regarding a transition which is a cluster of fixation points related to one another by a predetermined algorithm.

6. The method for analyzing eyetracker data of claim 4, wherein the dynamic hypermedia pages is viewed through a browser having an object model interface, further comprising accessing the object model interface of the browser to identify elements of the restored pages, and storing the identified elements of the restored pages in an elements database.

7. The method for analyzing eyetracker data of claim 4, further comprising time synchronizing the fixation data to the events data.

8. The method for analyzing eyetracker data of claim 4, further comprising calibrating a coordinate system of the eyetracker data to a screen coordinate system used in viewing the display of dynamic hypermedia pages.

9. An information storage media for analyzing eyetracker data collected from a user viewing a display of dynamic hypermedia pages comprising:

information that monitors location and time of the user's gaze, and stores eyetracker data of the location and time of the user's gaze in an eyetracker data file;

information that monitors the displayed pages and stores content of the displayed pages into a memory;

information that monitors events and time data of the events that cause a change in the displayed pages;

information that stores into an event log the events and corresponding time data that cause the change in the displayed pages;

information that receives the eyetracker data from the eyetracker data file;

information that processes the eyetracker data into fixation data indicative of the user's interest;

information that restores the displayed pages from the memory and the events data in the event log by reenacting the events of the event data; and information that maps the fixations data onto the restored pages to thereby identify elements-of-regard upon which the user fixated and locations thereof, and stores the identified elements-of-regard and the locations thereof in an elements-of-regard database.

10. The information storage media for analyzing eyetracker data of claim 9, wherein the fixation data is at least one of information regarding fixation points at which the user's gaze becomes fixated, information regarding an area proximate to a fixation point that is contained within a bounding box, and information regarding a transition which is a cluster of fixation points related to one another by a predetermined algorithm.

11. The information storage media for analyzing eyetracker data of claim 9, further comprising information that accesses an object model interface of a browser used to view the dynamic hypermedia pages to identify elements of the restored pages and store the identified elements of the restored pages in an elements database.

12. A system for analyzing eyetracker data collected from a user viewing a display of dynamic hypermedia pages through a browser having an object model interface comprising:

an eyetracker that monitors location and time of the user's gaze, and stores eyetracker data of the location and time of the user's gaze in an eyetracker data file;

a logging tool that monitors the displayed pages and stores content of the displayed pages into a memory, the logging tool monitoring and storing into an event log events and time data of the events that cause a change in the displayed pages; and a mapping tool that receives the eyetracker data from the eyetracker data file, processes the eyetracker data into fixation data indicative of the user's interest, restores the displayed pages from the memory and the events data in the event log by reenacting the events of the event data, and maps the fixations data onto the restored pages;

wherein the mapping tool accesses the object model interface of the browser to identify elements of the restored pages and stores the identified elements of the restored pages in an elements database.

13. The system for analyzing eyetracker data of claim 12, wherein the fixation data is at least one of information regarding fixation points at which the user's gaze becomes fixated, information regarding an area proximate to a fixation point that is contained within a bounding box, and information regarding a transition which is a cluster of fixation points related to one another by a predetermined algorithm.

14. A method for analyzing data collected from a user viewing a display of dynamic hypermedia pages through a browser having an object model interface comprising:

monitoring location and time of the user's gaze, and storing the location and time as eyetracker data;

processing the eyetracker data into fixations data indicative of the user's interest;

monitoring content of the displayed pages and storing content of the displayed pages into a memory;

monitoring events and time data of the events that cause a change in the displayed pages;

storing into an event log the events and corresponding time data that cause the change in the displayed pages;

restoring the displayed pages from the memory and the events data in the event log by reenacting the events of the event data;

mapping the fixations data onto the restored pages;

accessing the object model interface of the browser to identify elements of the restored pages; and storing the identified elements of the restored pages in an elements database.

15. The method for analyzing eyetracker data of claim 14, wherein the fixation data is at least one of information regarding fixation points at which the user's gaze becomes fixated, information regarding an area proximate to a fixation point that is contained within a bounding box, and information regarding a transition which is a cluster of fixation points related to one another by a predetermined algorithm.

16. The method for analyzing eyetracker data of claim 14, further comprising time synchronizing the fixation data to the events data.

17. The method for analyzing eyetracker data of claim 14, further comprising calibrating a coordinate system of the eyetracker data to a screen coordinate system used in viewing the display of dynamic hypermedia pages.

18. An information storage media for analyzing eyetracker data collected from a user viewing a display of dynamic hypermedia pages through a browser having an object model interface comprising:

information that monitors location and time of the user's gaze, and stores eyetracker data of the location and time of the user's gaze in an eyetracker data file;

information that processes the eyetracker data into fixation data indicative of the user's interest;

information that monitors the displayed pages and stores content of the displayed pages into a memory;

information that monitors events and time data of the events that cause a change in the displayed pages;

information that stores into an event log the events and corresponding time data that cause the change in the displayed pages;

information that restores the displayed pages from the memory and the events data in the event log by reenacting the events of the event data, maps the fixation data onto the restored pages;

information that accesses the object model interface of the browser to identify elements of the restored pages; and information that stores the identified elements of the restored pages in an elements database.

19. The information storage media for analyzing eyetracker data of claim 18, wherein the fixation data is at least one of information regarding fixation points at which the user's gaze becomes fixated, information regarding an area proximate to a fixation point that is contained within a bounding box, and information regarding a transition which is a cluster of fixation points related to one another by a predetermined algorithm.

20. The system for analyzing eyetracker data of claim 1, wherein the mapping tool time synchronizes the fixation data to the events data.

21. The information storage media for analyzing eyetracker data of claim 9, further comprising information that time synchronizes the fixation data to the events data.

22. The system for analyzing eyetracker data of claim 12, wherein the mapping tool time synchronizes the fixation data to the events data.

23. The information storage media for analyzing eyetracker data of claim 18, further comprising information that time synchronizes the fixation data to the events data.

* * * * *